US012217687B1

(12) United States Patent
Cook

(10) Patent No.: US 12,217,687 B1
(45) Date of Patent: Feb. 4, 2025

(54) STRESS COMPENSATION SYSTEM, STRESS COMPENSATION METHOD, AND APPARATUS USING THE SAME

(71) Applicant: Samsung Display Co., LTD., Yongin-si (KR)

(72) Inventor: Gregory William Cook, San Jose, CA (US)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/485,628

(22) Filed: Oct. 12, 2023

(51) Int. Cl.
*G09G 3/3233* (2016.01)

(52) U.S. Cl.
CPC ... *G09G 3/3233* (2013.01); *G09G 2320/0233* (2013.01); *G09G 2320/0295* (2013.01); *G09G 2320/045* (2013.01); *G09G 2320/046* (2013.01); *G09G 2320/048* (2013.01); *G09G 2360/16* (2013.01)

(58) Field of Classification Search
CPC ....... G09G 2340/02; G09G 2300/0452; G09G 2320/043; G09G 2320/048
See application file for complete search history.

(56) References Cited

U.S. PATENT DOCUMENTS

2005/0024562 A1* 2/2005 Hoff .................... G02F 1/13363 349/117
2015/0062202 A1* 3/2015 Lu ........................ G09G 3/3208 345/691

* cited by examiner

*Primary Examiner* — Van N Chow
(74) *Attorney, Agent, or Firm* — KILE PARK REED & HOUTTEMAN PLLC

(57) ABSTRACT

A method of compensating for accumulated stress for a display device includes receiving consecutive frames of display data including pixel data, then producing compensated display data from the received display data using a stress profile of accumulated stress of a display panel where the compensated display data includes a plurality of consecutive frames. The method further includes providing the compensated display data to the display panel for display, sampling the compensated display data to produce a plurality of sampled pixel data for a plurality of pixels disposed in a block of spatially contiguous pixels, where the block of spatially contiguous pixels includes a pixel, producing a quantized unbiased average stress value for the pixel using the plurality of sampled pixel data, the producing of the quantized unbiased average stress value including adding a dither value, and updating the stress profile using the produced quantized unbiased average stress value.

20 Claims, 15 Drawing Sheets

| | | | | | | | |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 8B

| | | | |
|---|---|---|---|
| 0 | 1 | 2 | 3 |
| 4 | 5 | 6 | 7 |
| 8 | 9 | 10 | 11 |
| 12 | 13 | 14 | 15 |

FIG. 8A

STRESS COMPENSATION SYSTEM, STRESS COMPENSATION METHOD, AND APPARATUS USING THE SAME

TECHNICAL FIELD

The disclosure generally relates to an improved method and apparatus that compensates for accumulated stress in a display device. More particularly, the subject matter disclosed herein relates to improvements to generating stress profiles for a display panel.

SUMMARY

As a display device ages, individual pixels of a display device may no longer put out a same luminance for a certain applied driving current as compared to when the display device was new. This may cause issues sometimes referred to as image sticking, residual images, or ghosting, which manifests itself in lower than intended luminance for those pixels that have been driven more than other pixels over a life of the display device.

Such a reduction in luminance for a given driving current can be compensated for if the history of pixel usage is known. Specifically, if the stress (total time-integrated driving current) for the life of the display device is recorded for each pixel, it may be possible to compensate for this degradation phenomenon. However, doing so can be resource intensive as memory and processing requirements can become substantial, and cumulative errors during processing of stress data can become prohibitive.

To overcome these and other technical issues, the disclosure addresses the above problems by providing an improved sampling compensation system and a display stress compensation method and apparatus using the same, which may include, among other things, sampling image data provided to a display device, then calculating and averaging a stress value for blocks of contiguous pixels using the sampled data while assuring that the averaged a stress value is unbiased.

In an embodiment, a method of compensating for accumulated stress for a display device includes receiving display data including pixel data, the received display data including a plurality of consecutive frames; producing compensated display data from the received display data using a stress profile of accumulated stress of a display panel, the compensated display data including the plurality of consecutive frames; providing the compensated display data to the display panel; sampling the compensated display data to produce a plurality of sampled pixel data for a plurality of pixels disposed in a block of spatially contiguous pixels, the block of spatially contiguous pixels including a pixel; producing a quantized unbiased average stress value for the pixel using the plurality of sampled pixel data, the producing of the quantized unbiased average stress value including adding a dither value to an average stress value; and updating the stress profile using the produced quantized unbiased average stress value.

In another embodiment, a method for generating a stress profile for a display device includes sampling a compensated display data to produce a plurality of sampled pixel data for a plurality of pixels disposed in a block of spatially contiguous pixels, the block of spatially contiguous pixels including a pixel; producing a quantized unbiased average stress value for the pixel using the plurality of sampled pixel data, the producing of the quantized unbiased average stress value including adding a dither value to an average stress value; and updating the stress profile using the produced quantized average stress value.

In yet another embodiment, a stress profile system includes sampling circuitry that samples a compensated display data to produce a plurality of sampled pixel data for a plurality of pixels disposed in a block of spatially contiguous pixels, the block of spatially contiguous pixels including a pixel; stress circuitry that produces stress values of the plurality of sampled pixel data; and averaging circuitry that produces a quantized unbiased average stress value for the pixel using the stress values of the plurality of sampled pixel data, the producing of the quantized unbiased average stress value including adding a dither value to an average stress value.

BRIEF DESCRIPTION OF THE DRAWINGS

In the following section, the aspects of the subject matter disclosed herein will be described with reference to embodiments illustrated in the figures, in which:

FIGS. 8A and 8B depict examples of blocks of contiguous pixels that may be produced by temporal and/or concurrent sampling according to an embodiment and that may be used to produce unbiased averages usable to update a stress profile;

DETAILED DESCRIPTION

Figure 1:
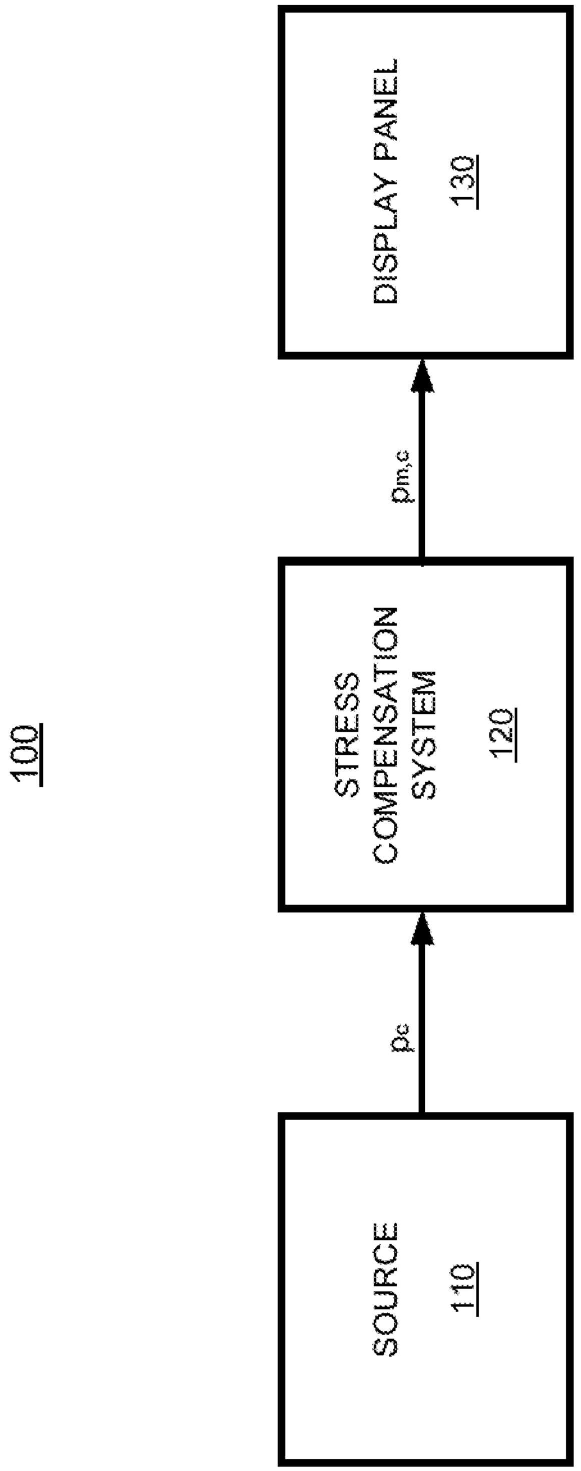
FIG. 1 is a schematic block diagram of a display apparatus that includes stress compensation system to compensate for luminance degradation according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components, and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. Additionally, the particular features, structures, or characteristics may be combined in any suitable manner in one or more embodiments. Also, depending on the context of discussion herein, a singular term may include the corresponding plural forms and a plural term may include the corresponding singular form.

Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

It is further noted that various figures (including component diagrams) shown and discussed herein are for illustrative purposes only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. It will be further understood that the terms "comprise," "include," "have," and their variations, when used in this specification, specify the presence of stated features, integers, steps, operations, elements, and/or components, but do not preclude the presence or addition of one or more other features, integers, steps, operations, elements, components, and/or groups thereof.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

As used herein, the terms "circuit" and "circuitry" can refer to any combination of dedicated logic, programmable logic, tangible memories (e.g., Read Only Memories, Random Access Memories, magnetic discs, optical discs), and computer/processor/controller based hardware operating upon any combination of software and firmware disposed in a memory capable of being accessed by the computer/processor/controller. For example, "circuitry" can refer to an Application Specific Integrated Circuit (ASIC), a microprocessor based system operating upon software/firmware residing in a Read Only Memory and manipulating data in a Random Access Memory, or a combination thereof.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

The term "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

The term "and/or" includes all combinations of one or more of which associated configurations may define. For example, "A and/or B" may be understood to mean "A, B, or A and B."

The term "display data" as used herein refers to any type of data that a display panel may visually represent on its screen. Some examples of the "display data" are a picture, photo, image, video, GUI, and the like.

The term "pixel data" as used herein refers to any type of data that is included in display data for unit pixels of a display panel.

The term "frame" as used herein refers to a single complete image that may be displayed on a screen.

The term "block averaging" as used herein refers to determining a stress value for a block (or a number of contiguous pixels) based on a number of sampled pixels over at least one frame.

The term "unbiased average" as used herein refers to determining an average value of a plurality of values (e.g., a number of stress values of contiguous pixels) based on a number of sampled pixels over at least one frame while removing bias that may accumulate due to quantization of data.

The term "dither value" as used herein refers to a parameter that may be used in a dithering process usable to remove bias. Some examples of the "dither value" include a uniform random variable.

The term "quantization" as used herein refers to the process of mapping values to a smaller set of discrete finite values by way of truncation or rounding. In practice, this can involve zeroing or removing some one or more of the least significant bits from a calculated number. By way of example and as will be explained below, a floor function can inherently quantize a value by rounding to a lower integer.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Turning now to the figures, FIG. 1 is a schematic block diagram of a display apparatus 100 that uses stress compensation to compensates for luminance degradation according to an embodiment. As shown in FIG. 1, the display apparatus 100 may include a source 110, a stress compensation system 120, and a display panel 130 with the source 110 communicatively coupled to the stress compensation system 120, and the stress compensation system 120 communicatively coupled to the display panel 130.

The source 110 may be a computer-based device capable of either storing display data $p_c$ (i.e., data capable of being displayed on any number of display devices) or receiving display data $p_c$ from an external device, such as a remote server or a broadcasting device, then forwarding the display data $p_c$ to the stress compensation system 120. However, in other examples, the source 110 may take the form of dedicated electronics and/or optical systems capable of performing the same tasks.

The stress compensation system 120 of FIG. 1 may be a combination of dedicated logic. computer-based memory, and processing systems capable of receiving display data $p_c$ from the source 110 or any other number of devices capable of providing display data $p_c$, compensating the received display data to produce compensated display data $p_{m,c}$, then providing the compensated display data $p_{m,c}$ to the display panel 130. However, in other examples, the form of the stress compensation device 120 may vary so as to take the form of dedicated electronics only, a processor only based system only, or any number of hybrid systems as is discussed below.

The display panel 130 may be a display device capable of receiving the compensated display data $p_{m,c}$, performing a number of intermediate operations on compensated display data $p_{m,c}$ usable to map the compensated display data $p_{m,c}$ to appropriate individual pixels incorporated into the display panel 130, then display the compensated display data $p_{m,c}$. While the display panel 130 may be an Organic Light Emitting Display (OLED) panel that includes a plurality of OLED-type pixels, the exact form of the display panel may vary to include any form of pixels whether or not such pixels are known to degrade with time and/or usage.

Figure 2:
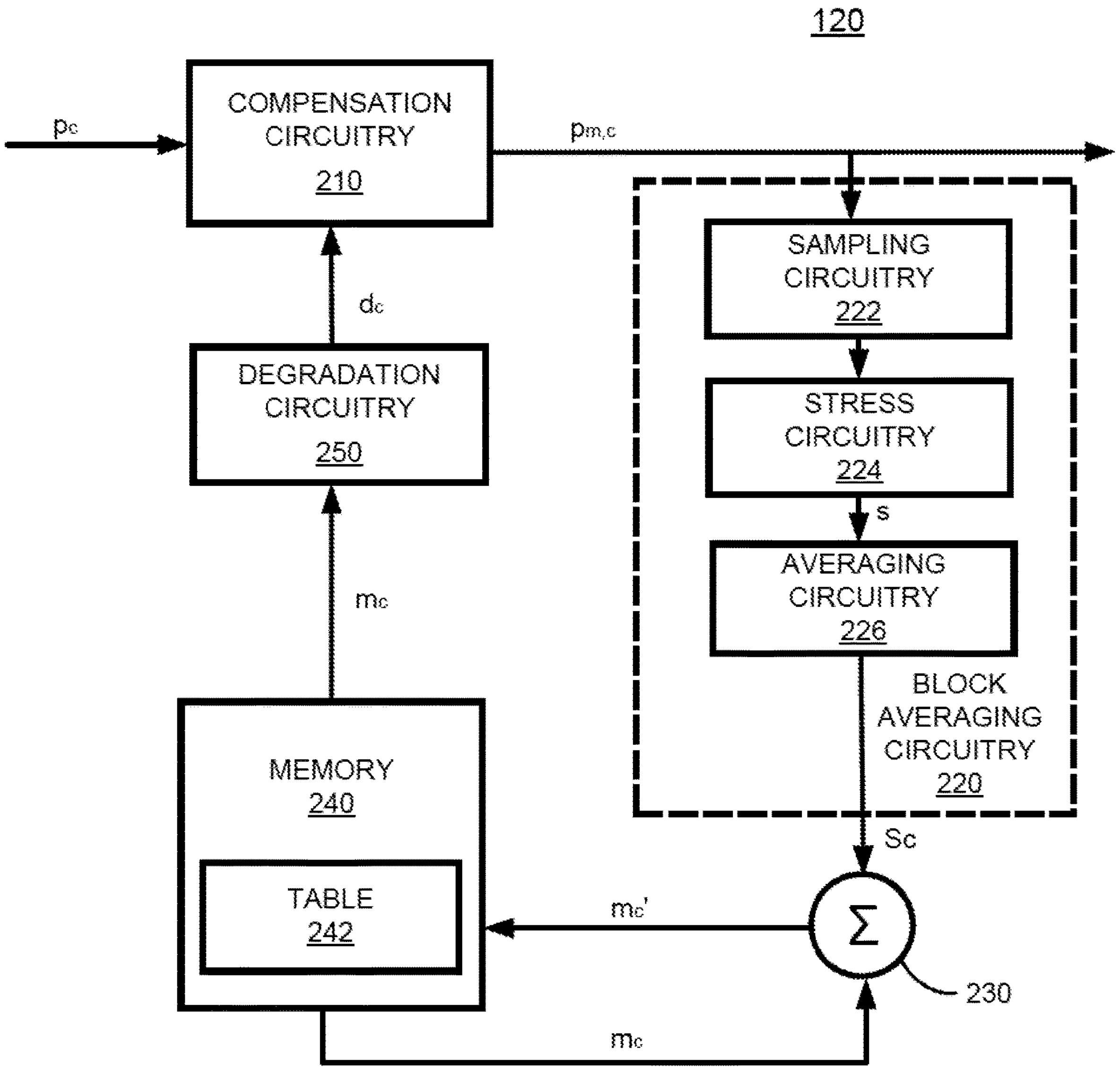
FIG. 2 is a schematic functional flow diagram of the stress compensation system of FIG. 1 according to an embodiment.

Turning now to FIG. 2, FIG. 2 is a schematic functional flow diagram of the stress compensation system 120 of FIG. 1 according to an embodiment. As illustrated in FIG. 2, the stress compensation system 120 may include stress compensation circuitry 210, block averaging circuitry 220, adding circuitry 230, a memory 240, and degradation circuitry 250. The block averaging circuitry 220 may include sampling circuitry 222, stress circuitry 224, and averaging circuitry 226. The memory 240 may include a table 242 that stores a stress profile me for a display panel, such as the display panel 130 of FIG. 1.

Term "table" as used herein may be a table of numbers (or "stress values") indicating (or from which may be inferred) the amount of stress each sub-pixel has been subjected to during the life of the display device. The term "stress" as used herein may be the total (time-integrated or accumulated) drive current that has flowed through each pixel or sub-pixel during the life of the display panel, e.g., the total charge that has flowed through each sub-pixel during the life of the display device. For example, a stress value may be a values that is proportional to a lifetime integral of driving current for a particular Organic Light Emitting Diode (OLED) pixel in a display panel. Similarly, a "stress profile" for a display panel may include values that are proportional to a lifetime integral of driving current for respective OLED pixels or for blocks of OLED pixels in the display panel.

In operation, the stress compensation circuitry 210 may receive display data $p_c$ from some form of data source, such as the source 110 of FIG. 1, and compensate the received display data $p_c$ to produce compensated display data $p_{m,c}$. The compensated display data $p_{m,c}$, in turn, may be provided to both the aforementioned display panel 130 of FIG. 1 as well as to the block averaging circuitry 220. In various examples, the stress compensation circuitry 210 may compensate the received display data $p_c$ by multiplying each item of pixel data with an inverse of the degradation value $d_c$ representing a loss of efficiency of an individual pixel due to accumulated stress. However, in other embodiments the exact form of compensation may vary.

Figure 5:
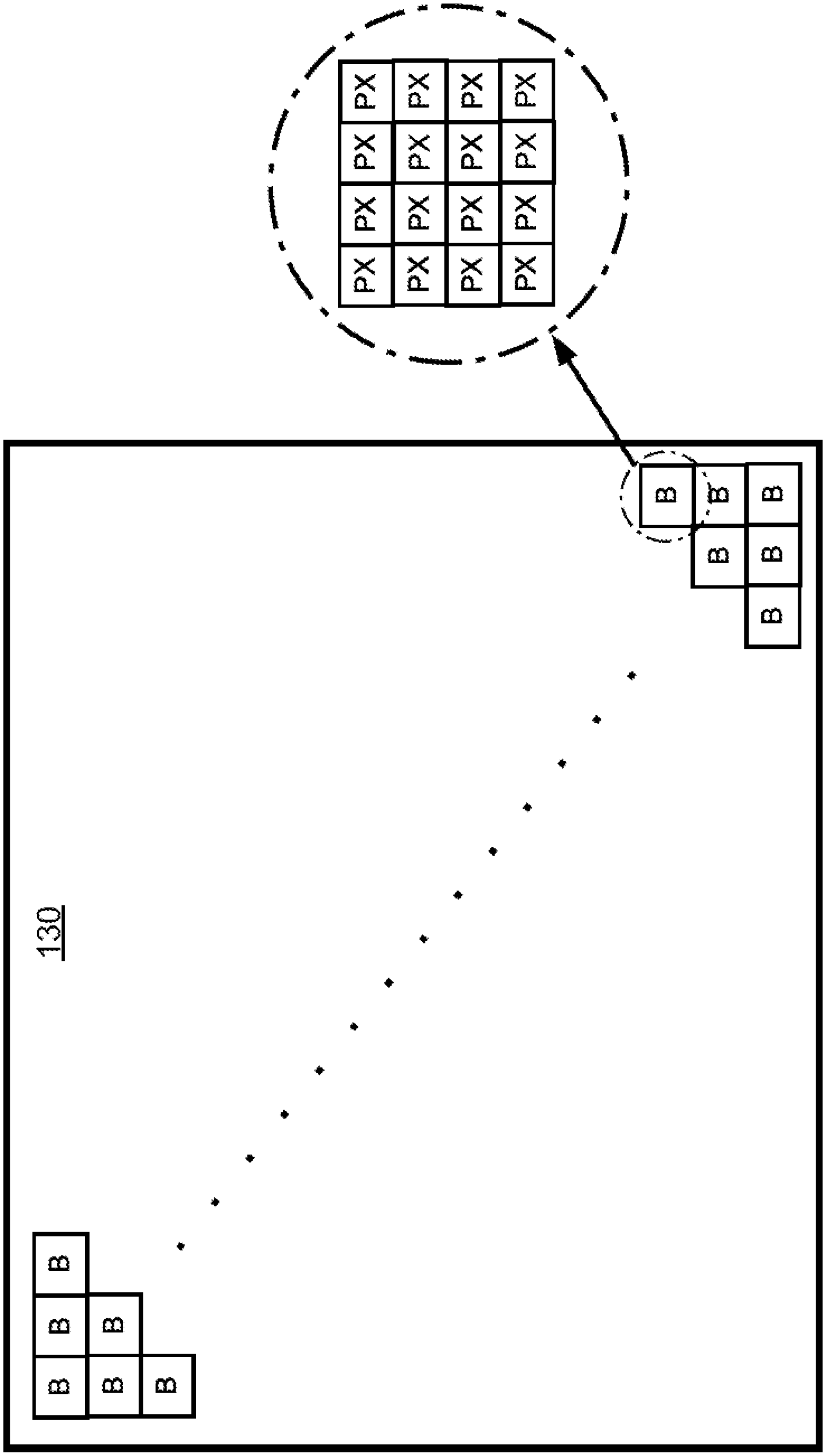
FIG. 5 illustrates a schematic plan view of pixels of a display panel divided up into blocks according to an embodiment.

During operation, the sampling circuitry 222 may selectively sample the compensated display data $p_{m,c}$ according to any of a number of various block averaging techniques. To explain such various technique, FIG. 5 is provided to demonstrate how the display panel 130 of FIG. 1 may be conceptually divided into individual blocks B with each block B being a 4 by 4 array of contiguous pixels PX. FIG. 5 depicts blocks B of pixels according to a 4 by 4 array of contiguous pixels PX, in other embodiments each block B may be of different shapes and sizes. For instance, each block B may be a 2 by 2 array of contiguous pixels PX, an 8 by 8 array of contiguous pixels PX, a 2 by 8 array of contiguous pixels PX, a 1 by 8 array of contiguous pixels PX, and so on. Various sampling techniques usable by the sampling circuitry 222 are hereafter described.

Figure 6A:
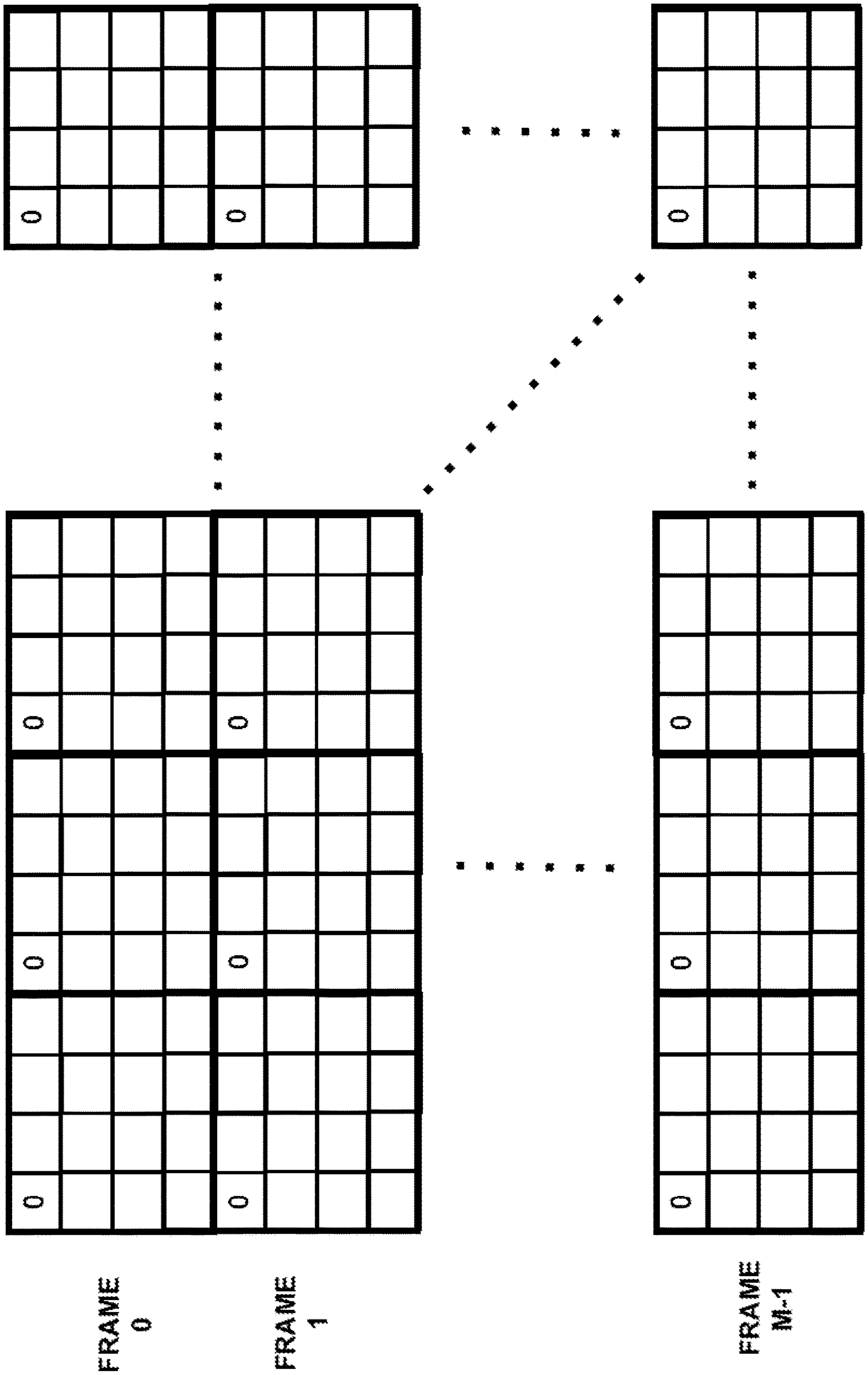
FIGS. 6A to 6D are diagrams illustrating an example of a sampling technique of pixel data according to an embodiment.
Figure 6B:
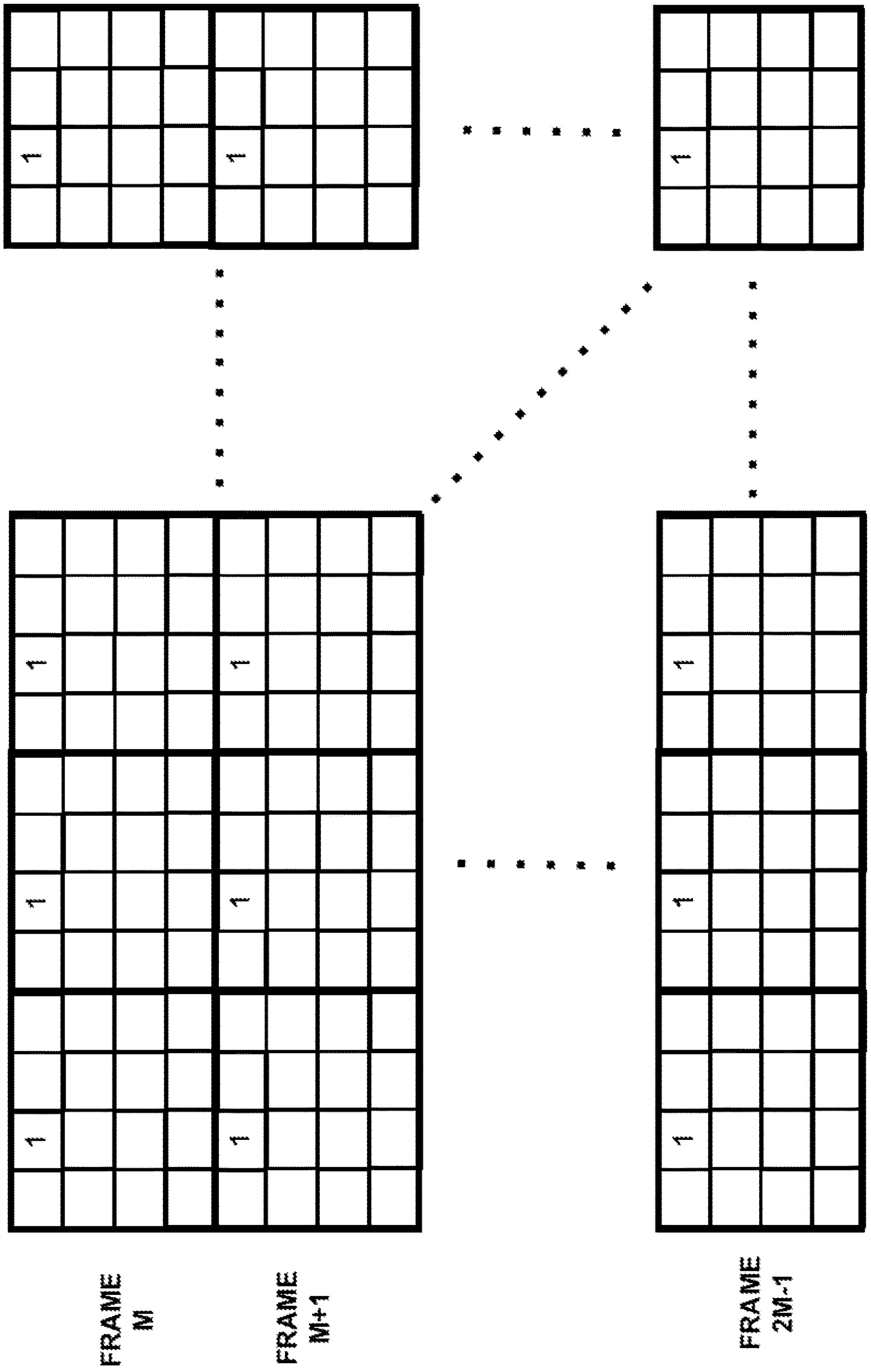
Figure 6C:
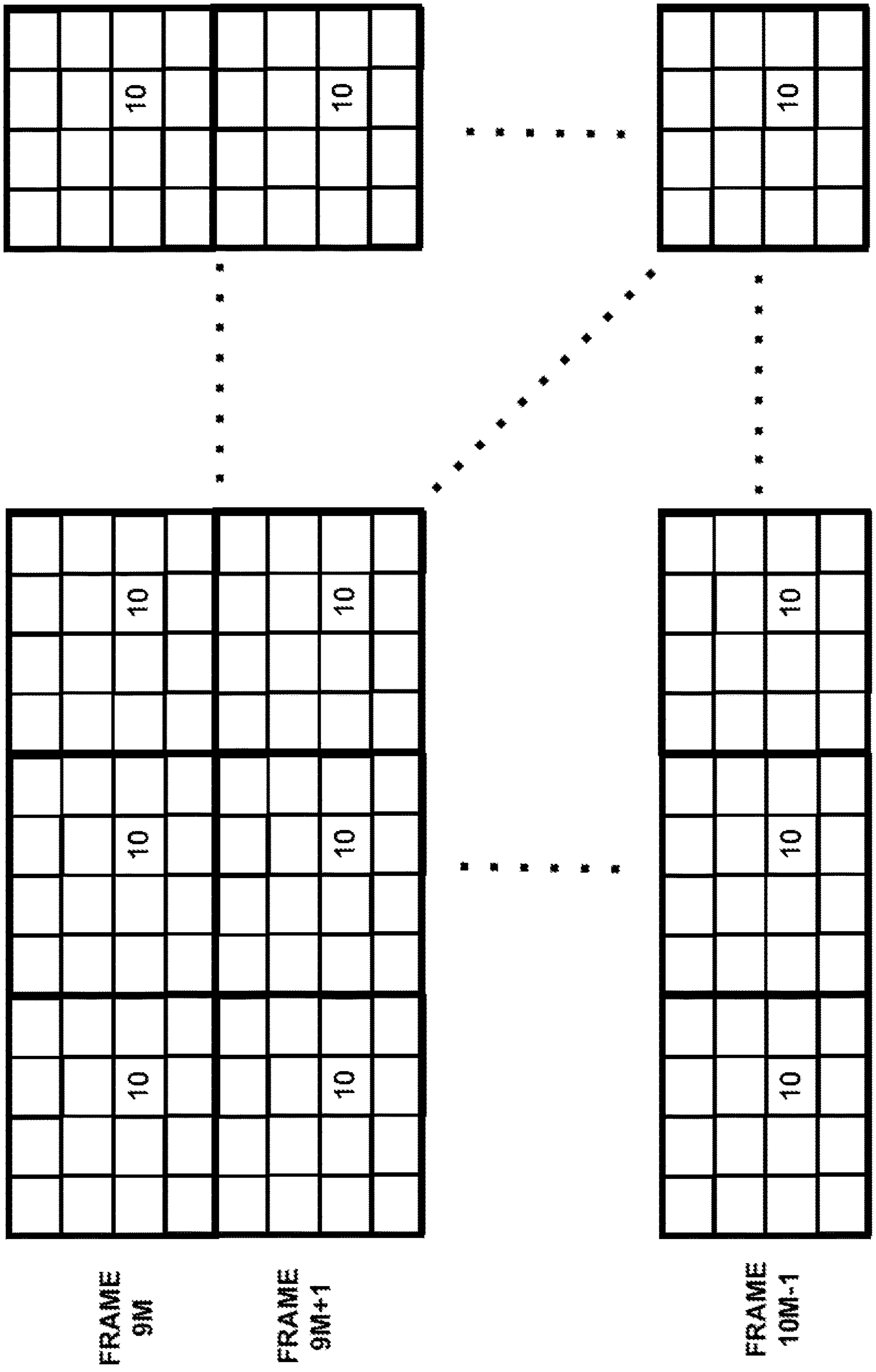
Figure 6D:
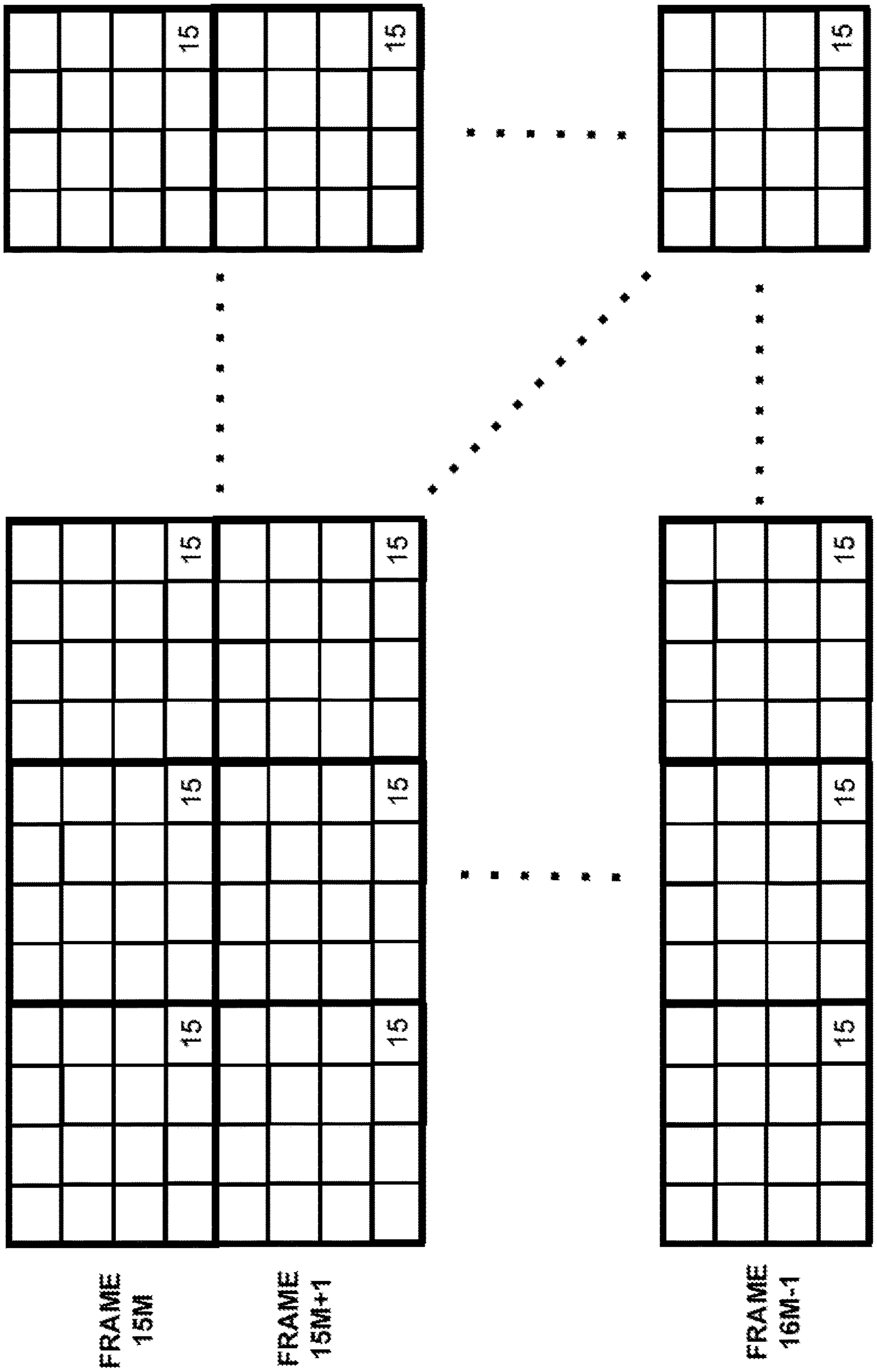

Turning to FIGS. 6A-6D, a first sampling technique is presented where sampling is sparce. Specifically, in the example of FIGS. 6A-6D, only every fourth pixel for a single line of pixels is sampled in a given frame. For instance, as depicted in FIG. 6A, for a display having a height of M blocks of 4 by 4 pixels (or 4M pixels), for a first frame FRAME 0, only the top left pixel 0 for the first row of blocks is sampled; for a second frame FRAME 1, only the top left pixel 0 for the second row of blocks is sampled; and so on until the top left pixel 0 is sampled for every block of every row of a display. Similarly, as is depicted in FIG. 6B, for a next sequence of M frames, in FRAME M, only pixel 1 for the first row of blocks is sampled; in FRAME M+1, only pixel 1 for the second row of blocks is sampled; and so on until pixel 1 is sampled for every block of every row of a display. This sampling technique continues as is shown in FIGS. 6C and 6D until every pixel (0 through 15) is sampled for every block in a display. According to the example of FIGS. 6A-6D, a total of 16M frames are used to sample every pixel location in the frame.

In still other embodiments, it is permissible that pixels be sampled less frequently. For example, instead of sampling pixels every frame, pixels may be sampled every other frame such that a total of 32M frames are used to sample every pixel. Similarly, in an embodiment where only every fourth frame is used for sampling, a total of 64M frames are used to sample every pixel. Conversely, sampling may occur at multiple block lines in a frame so that sampling occurs more frequently. For example, two samplings of different lines of 4×4 blocks might occur for a total of 8M frames to sample all pixel locations.

Figure 7:
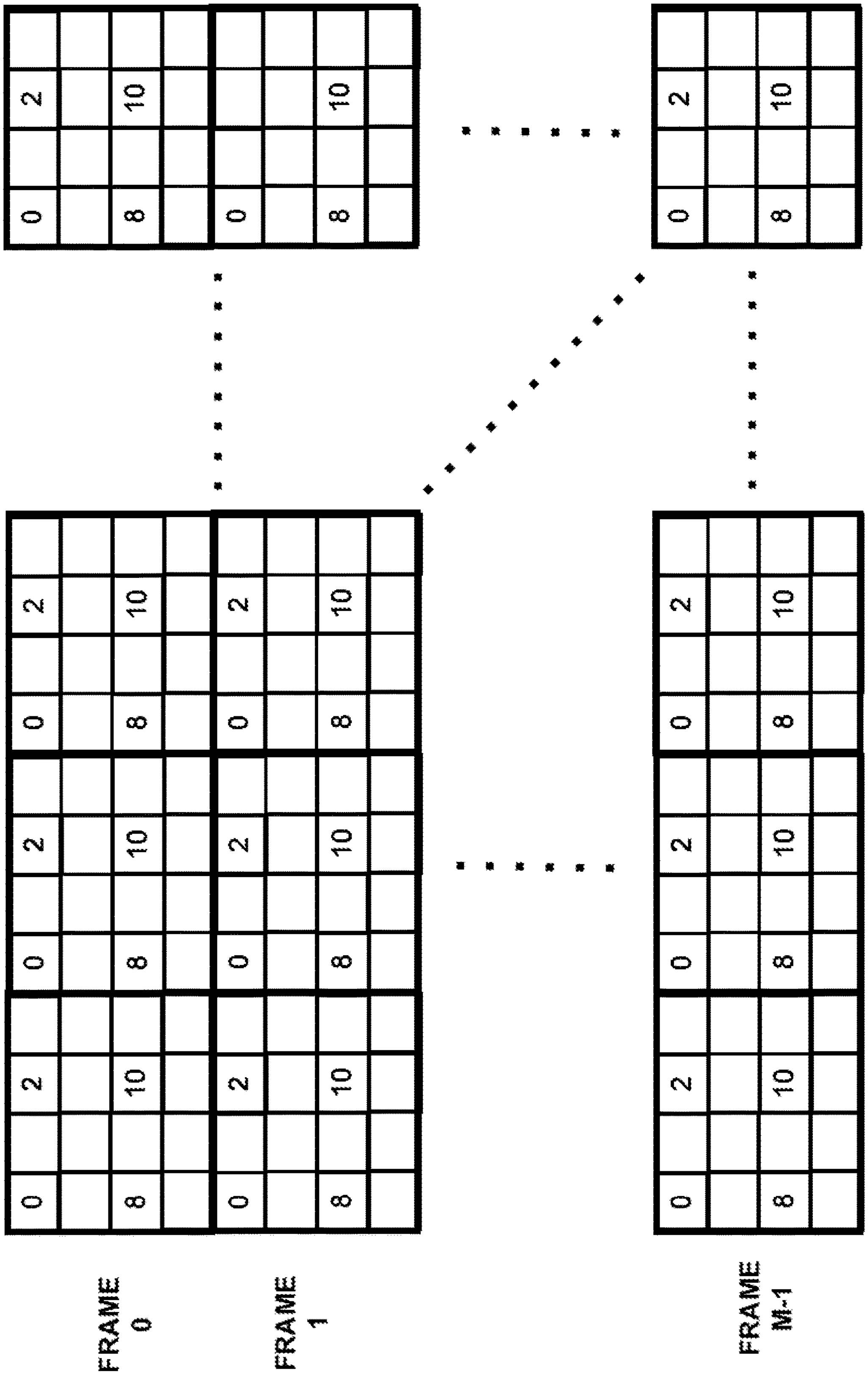
FIG. 7 is a diagram showing an example of a sampling technique of pixel data according to an embodiment.

Turning to FIG. 7, FIG. 7 depicts a variation of pixel sampling whereby, for each frame, four pixels (pixels 0, 2, 8, 10 in the example of FIG. 7) are sampled per block for a row of pixels. Using this approach, a total of 4M frames may be used to sample every pixel for a display. Still further, within the scope of the disclosure, it is permissible to sample a single pixel for every block of a display for each frame thereby using sixteen (16) total frames to sample every pixel of a display. Similarly, within the scope of the disclosure, it is permissible to sample all of the pixels in a block for each frame thereby using M total frames to sample every pixel of a display.

Continuing, it is further contemplated within the scope of the application that sampling rates may change over time. For instance, after the first one-hundred hours of use, a sampling rate may change, i.e., increase or decrease, to reflect that degradation of a given pixel type is not linear over time and usage, and that lower sampling rates may be acceptable in case that pixels are less likely degraded for the same current stress as compared to another time.

Returning to FIG. 2, as pixel data is sampled, the stress circuitry 224 may determine an amount of stress (or stress value) s for each pixel. In various embodiments, stress s may be determined using a look-up table. However, the exact approach to determining/calculating stress s may alternatively be determined using any number of mathematical operations, such as using a parametric equation. Each stress value s produced by the stress circuitry 224 may then be provided to the averaging circuitry 226.

The averaging circuitry 226 may receive the various stress values s provided by the stress circuitry 224 to produce an average stress value $\bar{s}$ for a given block of contiguous pixels. It is contemplated that the averaging circuitry 226 may produce an average stress value $\bar{s}$ for a given block of contiguous pixels only after a sufficient number stress values s (i.e., 2 or more) are provided to the averaging circuitry 226. For instance, turning to FIG. 8A, in a number of embodiments an average stress value $\bar{s}$ may be produced once all sixteen (16) pixels for a 4 by 4 block of data are accumulated. Similarly, when using 8 by 8 blocks of data as shown in FIG. 8B, an average stress value $\bar{s}$ may be produced once all sixty-four (64) pixels are accumulated according to a number of embodiments. However, it is to be appreciated that, instead of storing individual stress values s and later adding them together, it is contemplated that the averaging circuitry 226 may receive and accumulate the individual stress values s of the sampled pixels as they become available, which would reduce memory requirements. That is, for a given block of pixels, an incoming stream of stress values s for a block of pixels may be added to one another, e.g., using a single memory location or a single buffer thereby reducing memory usage. The number of pixels in a given block of data is hereby designated as $n_b$, with $n_b$ being sixteen (16) for the 4 by 4 block of FIG. 8A and $n_b$ being sixty-four (64) for the 8 by 8 block of FIG. 8B.

Figure 9A:
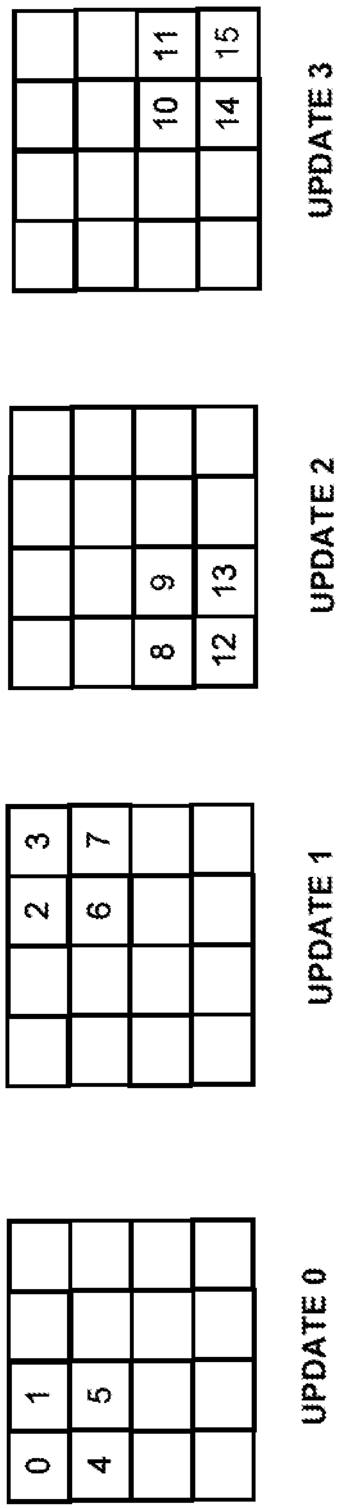
FIGS. 9A and 9B depict additional examples of blocks of contiguous pixels that may be produced by a sampling technique according to an embodiment and that may be used to produce unbiased averages usable to update a stress profile.
Figure 9B:
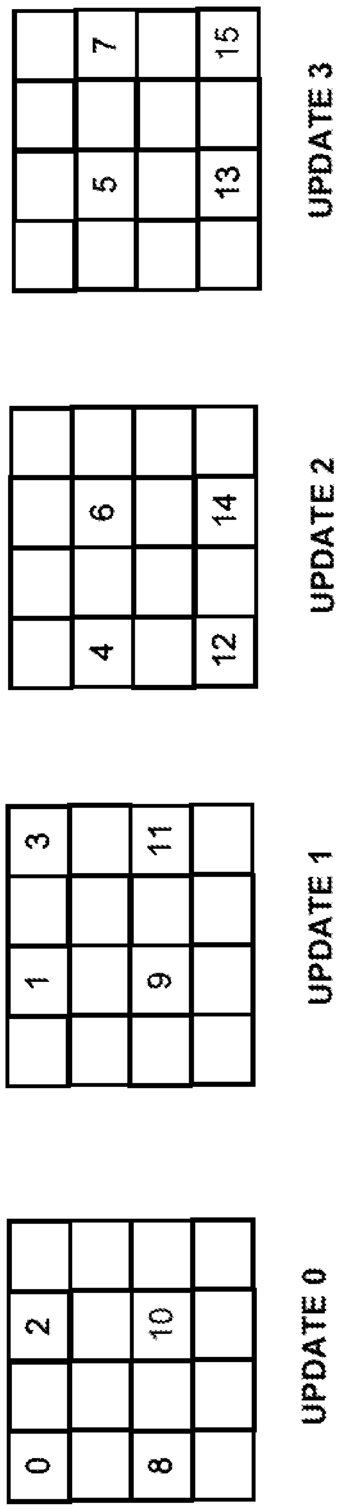
Figure 10A:
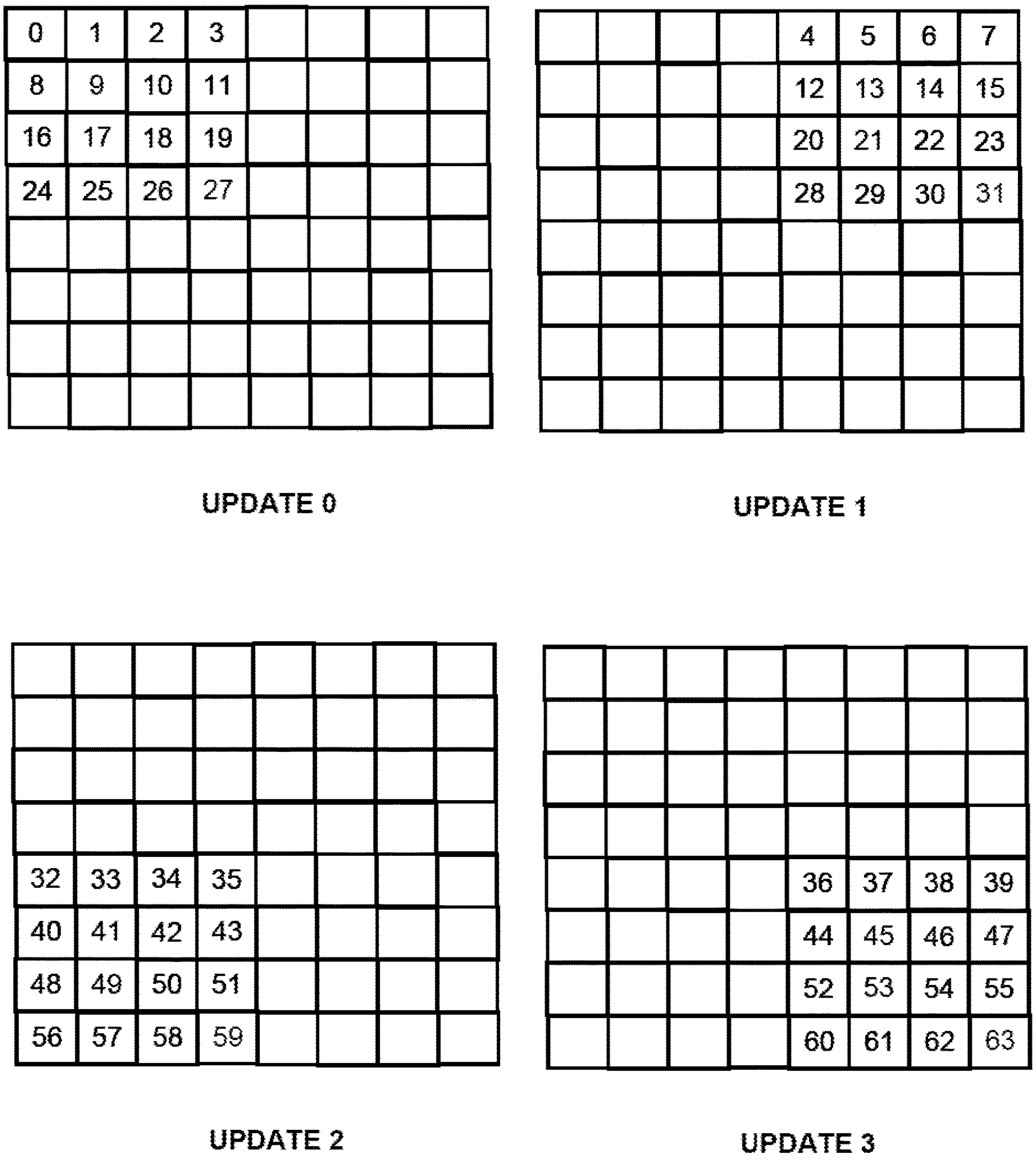
FIGS. 10A and 10B depict further examples of blocks of contiguous pixels that may be produced by a sampling technique according to an embodiment and that may be used to produce unbiased averages usable to update a stress profile.
Figure 10B:
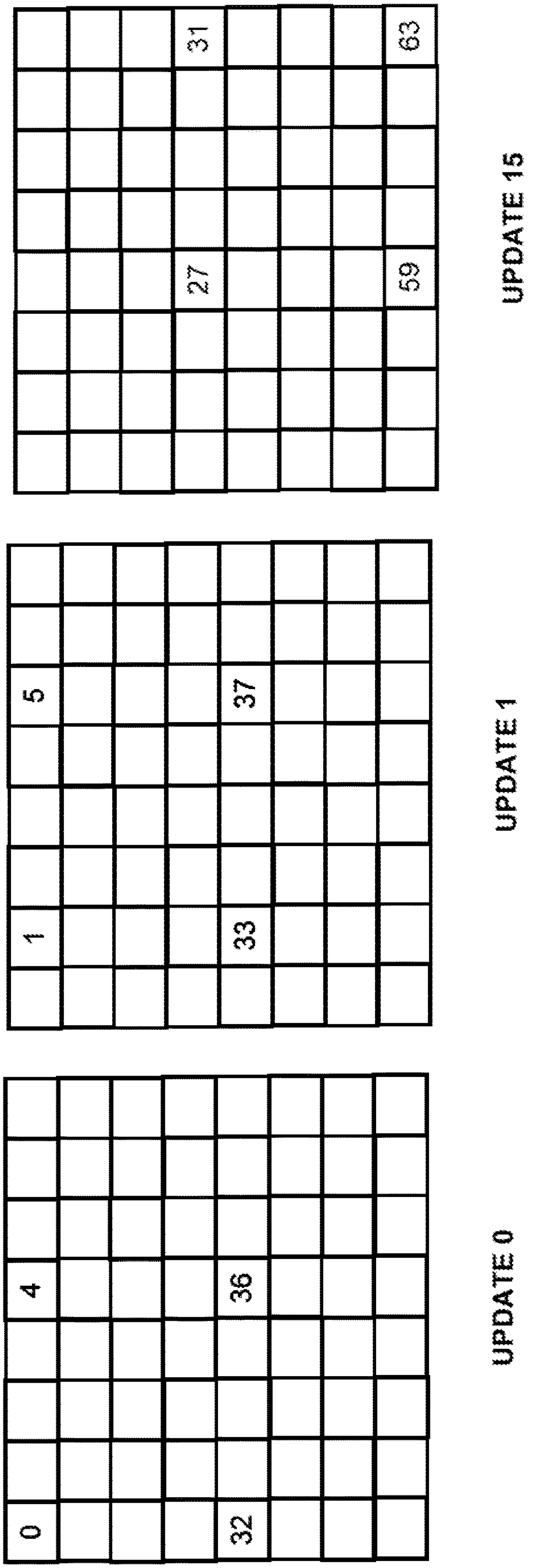

In various embodiments, the averaging circuitry 226 may produce an average stress value $\bar{s}$ in case that pixel data for every pixel or a subset of pixels for a given block of contiguous pixels is sampled. For example, in view of FIG. 9A, it is possible to produce an average stress value $\bar{s}$ using pixel data for only four of sixteen (16) pixels. As shown in FIG. 9A, while data from all sixteen (16) pixels of a 4 by 4 array are eventually used, four separate average stress values $\bar{s}$ for four respective pixels may be used in each of four update periods. FIG. 9B depicts a variation of this approach whereby the various pixels used to produce an average stress value $\bar{s}$ are spaced apart from one another within a block. To provide improved results, each pixel in each block can be sampled evenly over time. For the purpose of this disclosure, the number of sampled pixels from a block used to produce an average stress value $\bar{s}$ is designated as $n_s$ with the range of $n_s$ being $1<n_s \leq n_b$. FIGS. 10A and 10B likewise depict the idea that an average stress value s for an 8 by 8 block of sixty-four pixels may be produced in manners similar to that depicted in FIGS. 9A and 9B. In various embodiments, it may be useful for both $n_s$ and $n_b$ to be an integer power of two given that division using a number that is a power of two may be accomplished by a shift operation.

In view of FIGS. 8A-10B, it is to be appreciated that different stress values (i.e., 2 or more) used to calculate an average stress value $\bar{s}$ may be sampled from a common frame.

Returning to FIG. 2, the averaging circuitry 226 may produce/calculate a quantized unbiased average stress value $S_c$ according to the following equation:

$$S_c = \left\lfloor \frac{\left(\sum_{i=0}^{n_s-1} s_i\right) + D}{n_s} \right\rfloor \qquad \text{(Equation 1)}$$

where $s_i$ is a stress value of an i-th sampled pixel data of a block, i is a natural number, $n_s$ is the number of pixels sampled per block, the brackets indicate a floor function, and D is a dither value defined by Equation 2:

$$D \sim U[0, n_s-1] \qquad \text{(Equation 2)}$$

where $U[0, n_s-1]$ is an integer representing a uniform distribution between 0 and $n_s-1$. Similarly, for the example of FIG. 9A where $n_s$ is 4 for each update of a stress profile, dither value D will take the form of a uniform distribution between 0 and 3. In this averaging process, as is stated above a dither value D may be added to compensate for biasing that results from the quantization of a floor function.

Figure 3:
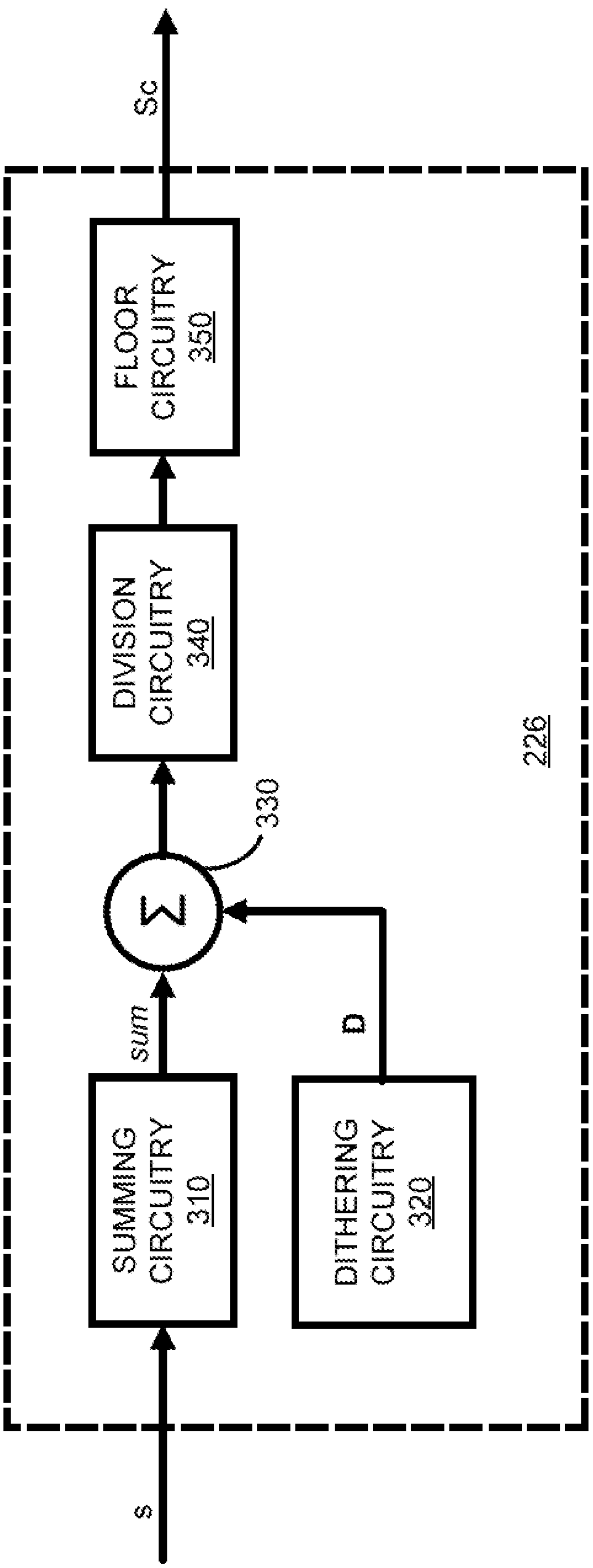
FIG. 3 is a schematic block diagram of an averaging circuitry of the stress compensation system of FIG. 2 according to an embodiment.

Turning now to FIG. 3, FIG. 3 illustrates a schematic functional view of the averaging circuitry 226 of FIG. 2 according to an embodiment usable to carry out the calculation of Equations 1 and 2 above. As shown in FIG. 3, the averaging circuitry 226 may include summing circuitry 310, dithering circuitry 320, adding circuitry 330, division circuitry 340, and floor circuitry 350.

In operation, the summing circuitry 310 may receive a number of stress values s for sampled pixel data of multiple pixels to produce a sum of stress values according to the following equation:

$$\text{sum} = \left(\sum_{i=0}^{n_s-1} s_i\right) \quad \text{(Equation 3)}$$

For each sum of stress values calculated by the summing circuitry 310, the dithering circuitry 320 may produce a dither value D according to Equation 2 above.

Thereafter, the adding circuitry 330 may add the sum calculated by the summing circuitry 310 and the dither value produced by the dithering circuitry 320 to produce a modified sum' according to the equation:

$$\text{sum}' = \left(\sum_{i=0}^{n_s-1} s_i\right) + D \quad \text{(Equation 4)}$$

Thereafter, the division circuitry 340 may divide the modified sum' above by $n_s$ to produce a quotient that the floor circuitry 350 operates upon to produce/calculate the quantized unbiased average stress value $S_c$ of Equation 1.

While the averaging circuitry 226 of FIG. 3 is shown according to one particular form, the arrangement of mathematical operations may vary in light that Equation 1 above may be rewritten according to equation 5:

$$S_c = \left\lfloor \frac{\left(\sum_{i=0}^{n_s-1} s_i\right)}{n_s} + \frac{D}{n_s} \right\rfloor \quad \text{(Equation 5)}$$

As can be seen above in Equation 5, the form of Equation 1 may take an alternate organization. Thus, the particular arrangement of circuitry 310, 320, 330, 340, and 350 in FIG. 3 may vary.

Returning again to FIG. 2, the adding circuitry 230 may add each quantized unbiased average stress value $S_c$ from the averaging circuitry 226 to an appropriate entry of the stress profile $m_c$ of table 242 to produce an updated stress profile $m_c'$ which is then stored in table 242. Accordingly, over time each entry of the stress profile $m_c$ of table 242 may be updated such that individual entries of the stress profile $m_c$ may be provided to the degradation circuitry 250. The degradation circuitry 250, in turn, may produce degradation values $d_c$ for each pixel in display panel 130, and provide these degradation values $d_c$ to the stress compensation circuitry 210 for future compensation, i.e., to produce the compensated display data $p_{m,c}$ discussed above. The degradation circuitry 250 may produce degradation values $d_c$ by any number of operations, such as by a simple inversion operation or by using a parametric equation. However, it is to be appreciated that the operations used by the degradation circuitry 250 may vary according to the particular form of data in a stress profile and the particular form of the stress compensation circuitry 210. After the stress profile $m_c$ and degradation values de are updated, the stress compensation circuitry 210 may compensate received display data pc using the degradation values dc.

Figure 4:
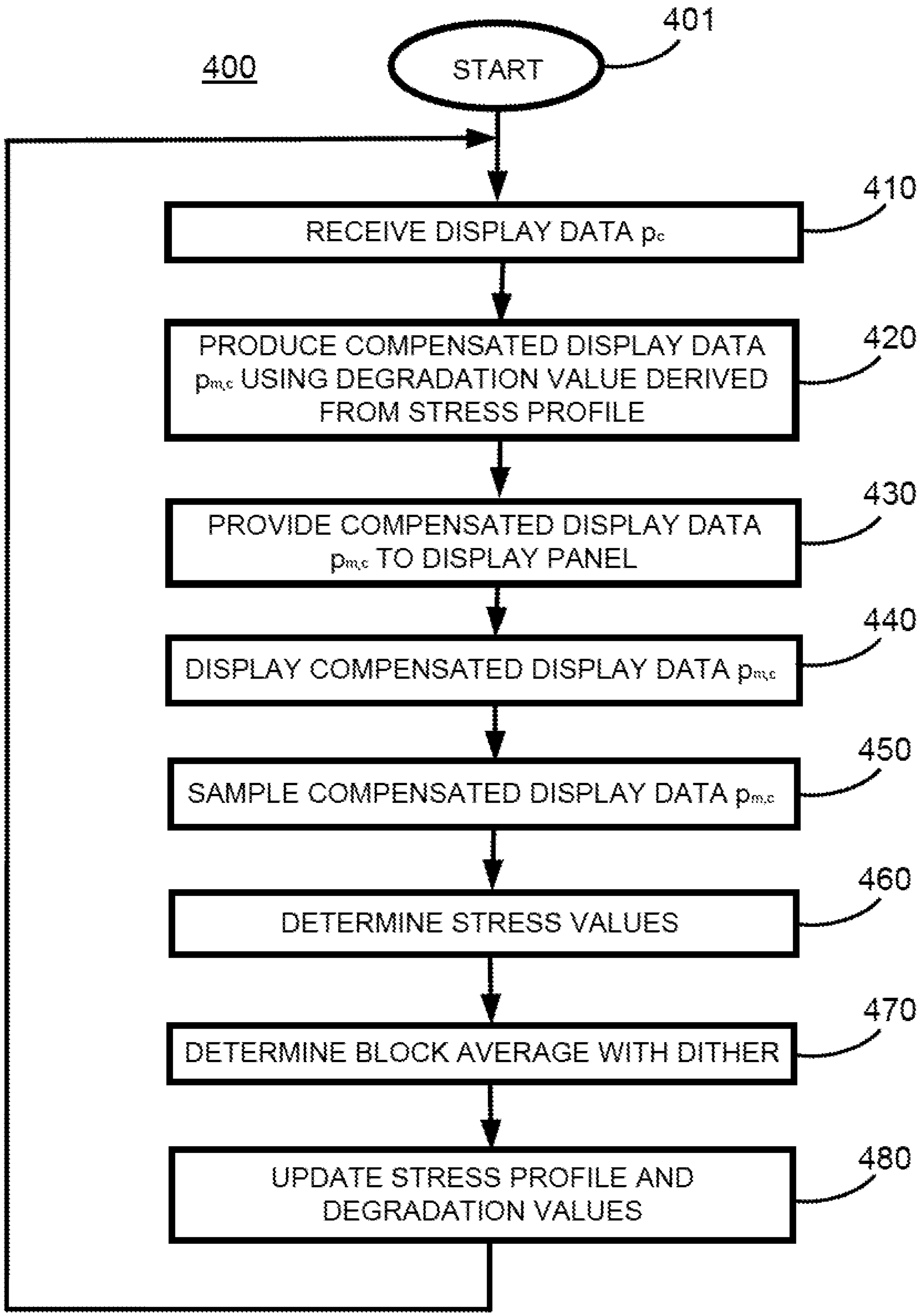
FIG. 4 is a schematic flowchart outlining a display compensation method according to an embodiment.

Turning now to FIG. 4, FIG. 4 is a flowchart outlining operations for a display compensation method 400 according to an embodiment. While the various steps in FIG. 4 are organized according to a particular order for ease of explanation, it is to be appreciated that, in differing embodiments, the various steps S410 to S480 may occur in different orders or may occur concurrently. For example, it is possible for steps S430 and S450 to occur simultaneously or that step S450 may occur before steps S430 and S440.

Operation may begin at step S401 and continue to step S410 where display data, such as the display data $p_c$ discussed above with respect to FIGS. 1-3 above, is received by a device, such as the stress compensation circuitry 210 of FIG. 2. Control continues to step S420.

In step S420, the received display data pc for each pixel received in step S410 may be compensated using a respective degradation value $d_c$ derived from a stress profile to produce compensated display data $p_{m,c}$. Next, in step S430, the compensated display data $p_{m,c}$ produced in step S420 may be provided to a display panel, such as the display panel 130 of FIG. 1. Then, in step S440, the compensated display data $p_{m,c}$ may be displayed. Control continues to step S450.

In step S450, the compensated display data $p_{m,c}$ may be sampled by a device, such as the sampling circuitry 222 in FIG. 2. As discussed above, sampling may take a number of different forms including the forms of sampling discussed with respect to FIGS. 6A to 10B. Next, in step S460, a stress value s may be determined for each sampled item of compensated display data. Control continues to step S470.

In step S470, a quantized unbiased average stress value $S_c$ is determined. The quantized unbiased average stress value $S_c$ of step S470 may be determined consistent with the device of FIG. 3 and Equations 1-5 discussed above while observing that variations consistent with the scope of the present disclosure may occur. Then in step S480, a stress profile, such as the stress profile $m_c$ discussed above with respect to FIG. 2, may be updated along with respective degradation values $d_c$. Thereafter, control jumps back to step S410 where display data may continue to be received and subsequently compensated using an updated stress profile $m_c'$ and degradation values $d_c$.

While particular embodiments of the subject matter have been described herein, it is to be understood that other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific teachings discussed above, but is instead defined by the following claims.

What is claimed is:

1. A method of compensating for accumulated stress for a display device, the method comprising:

receiving display data including pixel data, the received display data including a plurality of consecutive frames;

producing compensated display data from the received display data using a stress profile of accumulated stress of a display panel, the compensated display data including a plurality of consecutive frames;

providing the compensated display data to the display panel;

sampling the compensated display data to produce a plurality of sampled pixel data for a plurality of pixels disposed in a block of spatially contiguous pixels, the block of spatially contiguous pixels including a pixel;

producing a quantized unbiased average stress value for the pixel using the plurality of sampled pixel data, the producing of the quantized unbiased average stress value including adding a dither value to an average stress value; and updating the stress profile using the quantized unbiased average stress value.

2. The method of claim 1, wherein the average stress value for the pixel applies as an average stress value for each of the plurality of pixels disposed in the block of spatially contiguous pixels.

3. The method of claim 1, wherein at least two pixels of the sampled pixel data are sampled during different frames.

4. The method of claim 1, wherein at least two pixels of the sampled pixel data are sampled during a common frame.

5. The method of claim 1, wherein the block of spatially contiguous pixels is an m by p array where m and p are each positive integers greater than or equal to 1, and at least one is greater than 1, and a total number of pixels in the block of spatially contiguous pixels is $n_p$, where $n_p=m\times p$.

6. The method of claim 5, wherein the dither value D is a uniform random variable defined by $D\sim U[0, n_s-1]$, and $n_s$ is a total number of sampled pixels in the block of contiguous pixels.

7. The method of claim 5, wherein $n_s=n_p$.

8. The method of claim 5, wherein $n_s<n_p$.

9. The method of claim 5, wherein $n_s$ and $n_p$ are both integer powers of 2.

10. The method of claim 1, wherein the display panel is an Organic Light Emitting Diode (OLED) display panel, the plurality of pixels includes OLED pixels, and the stress profile includes values that are proportional to a lifetime integral of driving current for respective OLED pixels in the display panel.

11. The method of claim 6, wherein the quantized unbiased average stress value for the pixel of the block of spatially contiguous pixels is determined according to the following equation:

$$S_c = \left\lfloor \frac{\left(\sum_{i=0}^{n_s-1} s_i\right) + D}{n_s} \right\rfloor,$$

Sc is the quantized unbiased average stress value of the $n_s$ sampled pixels to a floor function, and $s_i$ is an individual stress value of i-th sampled pixel data of the block of spatially contiguous pixels, i being a natural number.

12. A method for generating a stress profile for a display device, the method comprising:

sampling a compensated display data to produce a plurality of sampled pixel data for a plurality of pixels disposed in a block of spatially contiguous pixels, the block of spatially contiguous pixels including a pixel;

producing a quantized unbiased average stress value for the pixel using the plurality of sampled pixel data, the producing of the quantized unbiased average stress value including adding a dither value; and updating a stress profile using the quantized unbiased average stress value.

13. The method of claim 12, wherein the quantized unbiased average stress value for the pixel applies as a quantized unbiased average stress value for each of the plurality of pixels disposed in the block of spatially contiguous pixels.

14. The method of claim 12, wherein at least two pixels of the sampled pixel data are sampled during a common frame.

15. The method of claim 12, wherein the block of spatially contiguous pixels is an m by p array where m and p are each positive integers greater than or equal to 1, and at least one is greater than 1, and a total number of pixels in the block of spatially contiguous pixels is $n_p$, where $n_p=m\times p$.

16. The method of claim 15, wherein the dither value D is a uniform random variable defined by $D\sim U[0, n_s-1]$, $n_s$ is a total number of sampled pixels in the block of contiguous pixels, and $n_s$ and $n_p$ are both integer powers of 2.

17. The method of claim 16, wherein the quantized unbiased average stress value for the pixel of the block of spatially contiguous pixels is determined according to the following equation:

$$S_c = \left\lfloor \frac{\left(\sum_{i=0}^{n_s-1} s_i\right) + D}{n_s} \right\rfloor,$$

$S_c$ is the quantized unbiased average stress value of the $n_s$ sampled pixels to a floor function, and $s_i$ is an individual stress value of i-th sampled pixel data of the block of spatially contiguous pixels, i being a natural number.

18. A stress profile system comprising:

sampling circuitry that samples a compensated display data to produce a plurality of sampled pixel data for a plurality of pixels disposed in a block of spatially contiguous pixels, the block of spatially contiguous pixels including a pixel;

stress circuitry that produces stress values of each of the plurality of sampled pixel data; and averaging circuitry that produces a quantized unbiased average stress value for the pixel using the stress values of the plurality of sampled pixel data, the producing of the quantized unbiased average stress value including adding a dither value to an average stress value.

19. The stress profile system of claim 18, wherein the dither value D is a uniform random variable defined by $D\sim U[0, n_s-1]$, and $n_s$ is a total number of sampled pixels in the block of contiguous pixels.

20. The stress profile system of claim 19, wherein the quantized unbiased average stress value for the pixel of the block of spatially contiguous pixels is determined according to the following equation:

$$S_c = \left\lfloor \frac{\left(\sum_{i=0}^{n_s-1} s_i\right) + D}{n_s} \right\rfloor,$$

$S_c$ is the quantized unbiased average stress value of the $n_s$ sampled pixels to a floor function, and $s_i$ is an individual stress value of i-th sampled pixel data of the block of spatially contiguous pixels, i being a natural number.

* * * * *